(No Model.)

R. THACKERAY & W. FERGUSON.
GROOVING CUTTER.

No. 591,180. Patented Oct. 5, 1897.

WITNESSES:
M. F. Bligh.
Chas. H. Luther Jr.

INVENTORS:
Richard Thackeray
William Ferguson
by Joseph A. Miller & Co.
Attys.

UNITED STATES PATENT OFFICE.

RICHARD THACKERAY AND WILLIAM FERGUSON, OF FALL RIVER, MASSACHUSETTS.

GROOVING-CUTTER.

SPECIFICATION forming part of Letters Patent No. 591,180, dated October 5, 1897.

Application filed February 26, 1896. Serial No. 580,844. (No model.)

*To all whom it may concern:*

Be it known that we, RICHARD THACKERAY and WILLIAM FERGUSON, of the city of Fall River, in the county of Bristol and State of Massachusetts, have invented a new and useful Improvement in Grooving-Cutters; and we hereby declare that the following is a full, clear, and exact description of the same, reference being had to the accompanying drawings, forming part of this specification.

This invention has reference to an improvement in the clamp by means of which a circular saw may be secured at any desired angle to the saw-arbor and a groove of any required dimension may be cut.

The invention consists in the peculiar and novel construction of the clamping-disks, by means of which the angle of the saw, with reference to the arbor, may be varied, as will be more fully set forth hereinafter and more particularly pointed out in the claims.

Figure 1:
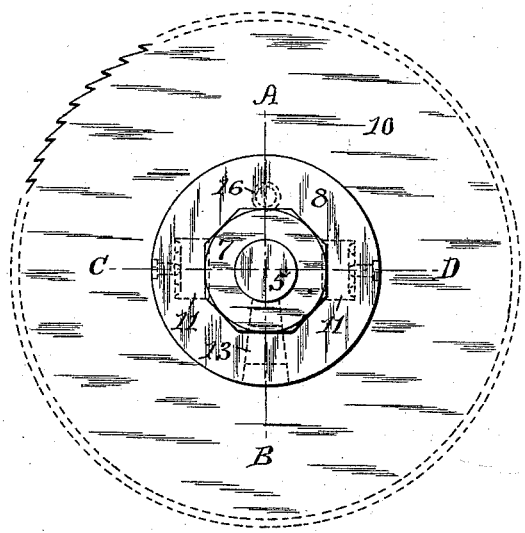
Figure 2:
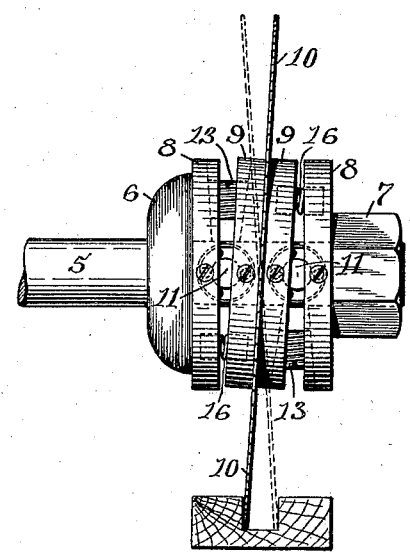
Figure 3:
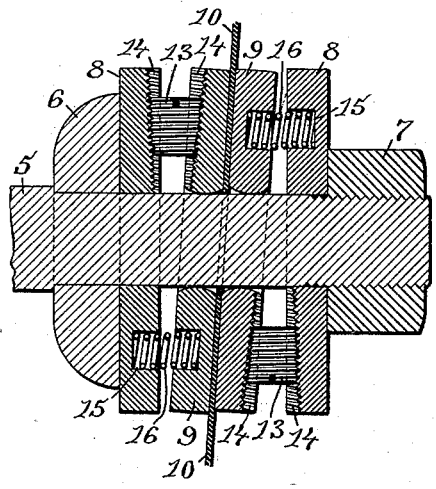
Figure 4:
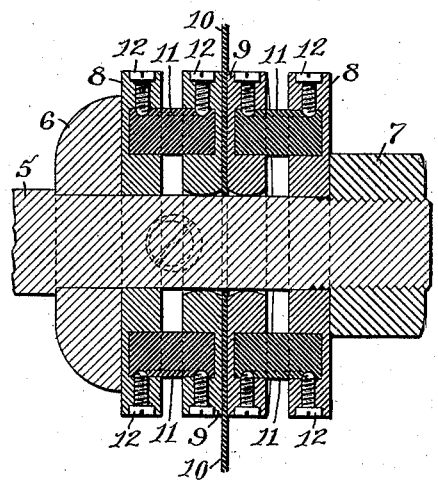

Figure 1 is an end view of a saw-arbor provided with a circular saw. Fig. 2 is a side view of the saw-arbor, showing the adjustable clamping-disks and a circular saw secured at an angle to the arbor for cutting a groove. Fig. 3 is a sectional view of the saw-arbor and the clamping-disks on the line A B of Fig. 1 through the center of the adjusting screw-plugs and the springs. Fig. 4 is a sectional view of the arbor and clamping-disks on the line C D through the center of the pivotal connections of the disks.

Similar numerals of reference indicate corresponding parts in all the figures.

In the drawings, 5 indicates the arbor; 6, a collar on the arbor, the face of which collar is at right angle to the axis of the arbor; 7, the nut in screw-thread engagement with the arbor; 8 8, two disks placed on the arbor and bearing one on the collar 6 and the other on the nut 7. These disks are always at right angle with the axis of the arbor.

9 9 are the adjustable disks, that bear against the saw-plate 10. The disks 9 are connected with the disks 8 on the line C D of Fig. 1 at the opposite sides by means of the blocks 11, made in the form of circular disks, as is shown in Fig. 2, and are secured to them by the set-screws 12, so as to form hinged connections. The disks 9 9 are loose on the arbor 5, the central holes in these disks being of such size or shape as to allow the disks to assume the required angular position. The circular blocks 11 11 are provided with annular grooves, into which the ends of the screws enter, and so permit of a slight movement of the ends of the screws in the grooves to facilitate the angular adjustment of the disks 9 9. On the line A B, which is at right angle to the line C D and to the pivotal connections of the disks, the screw-plugs 13 engage with the internal screw-threaded ways 14, formed on each one of the adjacent disks 8 and 9 radially from a point at the center of the disks. These screw-threaded ways are provided with angularly-disposed grooves, which form a section only of internal screw-threads approximately corresponding with the screw-threads on the conical screw-plugs 13 sufficiently so as to lead the plugs inward or outward as they are turned in one or the opposite direction and hold the screw-plugs in the adjusted position against the centrifugal force of the revolving arbor and saw. The screw-plugs 13 are not exact cones, but are slightly curved longitudinally, so as to have some part of the plugs always in engagement with the ways. On the adjacent sides of the disks the sockets 15 are formed, and in these is placed the coiled spring 16.

The saw, which is never of large diameter, is secured by being clamped between the disks 9 9 and by firmly screwing up the nut 7. The central hole in the saw is larger than the arbor, or it may be elliptical. Usually in saws which have to be adjusted angularly the hole in the circular saw is only sufficiently larger than the arbor to permit of the angular adjustment of the saw.

To enable others versed in the art to carry out and use our invention, we will describe the operation of the same more fully.

When the adjusting screw-plugs 13 are placed with the outer ends on a line with the periphery of the disks 8 9, the two disks will be parallel, and a saw clamped between the two disks 9 9 will be at right angle to the axis of the arbor. The saw will in this position make a cut of the width of the set of teeth of the saw, and it may be so used to cut lumber in the same manner as is usual with circular saws. If, now, a groove is to be cut of, say, twice the width of the cut of the saw, the screw-plugs 13 are screwed inward, say about half a turn, thereby moving the opposite sides of the disks 9, and with the same the saw, at such a slight angle that in rotating it will cut a groove wider than the natural cut of the saw. By screwing the plugs 13 farther in toward the arbor the angle of inclination of the disks 9 9 and the saw-plate is increased, and a wider groove is cut. As the plugs 13 are screwed inward, forcing the sides of the disks 9 9 away from the disks 8 8, the opposite sides of the disks 8 9 are brought closer together, and the springs 16 are more and more compressed, but in all positions yieldingly resist the actions of the screw-plugs.

The circular saw can be adjusted readily to any width of groove by screwing the plugs 13 either inward or outward, and it will cut a clean groove, either with or across the grain of the wood, without chipping.

Having thus described our invention, we claim as new and desire to secure by Letters Patent—

1. In a grooving-machine, the combination with a circular saw, the arbor, the usual collar on the arbor, and the nut for clamping the saw on the arbor, of two pairs of disks the two disks of each pair pivotally connected to permit of the oblique adjustment of one of each pair of disks, radial screw-threaded ways on the adjacent sides of each pair of disks, a conical screw-plug engaging with each of the screw-threaded ways of the adjacent disks, and a coiled spring interposed between each pair of disks on the side opposite the screw-plug; whereby the saw may be clamped between the two pairs of disks oblique to the axis of the arbor, as described.

2. In a grooving-machine, the combination with a circular saw, the arbor, the usual collar on the arbor, and the nut for clamping the saw on the arbor, of the disks 8 8 and 9 9, the radially-extending screw-threaded ways 14, and the screw-plugs 13; whereby the inner disks 9 9 bearing on the circular saw may be adjusted oblique to the arbor by screwing the screw-plugs on the opposite sides of the arbor toward or from the arbor, as described.

3. In a grooving-machine, the combination with the circular saw 10, the arbor 5, the collar 6 on the arbor, and the nut 7, of the two pairs of disks 8 9 8 9, the circular blocks 11 11 provided with annular grooves, and the screw 12 12 secured in the disks and extending into the annular grooves to form the pivotal connections between the disks 8 and 9, the radial screw-threaded ways 14, the screw-plugs 13, and the coiled springs 16, said screw-plugs and coiled springs disposed on a radial line at right angle to the pivotal connections of the disks and at opposite sides of the arbor; whereby the saw may be adjusted by screwing the screw-plugs on the opposite sides of the arbor toward or from the arbor and all adjusting parts contained within the peripheral surface of the disks, as and for the purpose described.

In witness whereof we have hereunto set our hands.

RICHARD THACKERAY.
WILLIAM FERGUSON.

Witnesses:
J. A. MILLER, Jr.,
M. F. BLIGH.